United States Patent [19]

Frano et al.

[11] Patent Number: 4,520,748

[45] Date of Patent: Jun. 4, 1985

[54] DIFFERENTIAL-VACUUM ALARM DEVICE

[75] Inventors: Francis G. Frano, Hoffman Estates; William E. Ruehl, Wheeling, both of Ill.

[73] Assignee: Illinois Tool Works Inc., Chicago, Ill.

[21] Appl. No.: 543,561

[22] Filed: Oct. 19, 1983

[51] Int. Cl.³ .......................... G01L 19/12; G08B 3/00
[52] U.S. Cl. ........................................ 116/70; 34/89; 116/DIG. 25
[58] Field of Search ................... 137/624.27; 116/112, 116/70, DIG. 25, 137 R; 34/89

[56] References Cited

U.S. PATENT DOCUMENTS

| 2,753,831 | 7/1956 | Davies | 116/112 |
|---|---|---|---|
| 2,779,305 | 1/1957 | Dunkelman | 116/112 |
| 2,782,747 | 2/1957 | Alderer | 116/112 |
| 3,085,349 | 4/1963 | Barbee | 116/112 |
| 3,381,652 | 5/1968 | Schaefer | 116/70 |
| 3,452,385 | 7/1969 | Fleck | 116/112 |
| 4,091,762 | 5/1978 | Ruehl | 116/112 |
| 4,365,582 | 12/1982 | Boyer | 116/70 |

Primary Examiner—Charles Frankfort
Assistant Examiner—Denis E. Corr
Attorney, Agent, or Firm—J. P. O'Brien; T. W. Buckman

[57] ABSTRACT

A differential-vacuum alarm device is disclosed. The device comprises a housing divided into three chambers by two walls. One wall isolates one chamber from the other two. The other wall, preferably transverse to the first wall and integral therewith, substantially isolates the second chamber from the third. The second wall preferably carries a vibratable reed which is activatable when air, moving via effects of differential vacuum, passes from the second chamber into the third. The housing further includes a cover, preferably snap engageable with the housing. The walls are preferably integral with, and depend from, the cover. Inner surface portions of the housing preferably include integral, U-shaped channels for receiving edge portions of the walls. With the wall edge portions engaged in the channels and the cover snap engaged with the housing, the three chambers are substantially isolated, one from the other. A housing bottom, forming a floor common to the three chambers, includes three through apertures. Each aperture provides a respective chamber with communication outside of the housing. One of the three chambers further includes another through aperture, preferably connectible to a vacuum source. One of the other two chambers similarly includes another through aperture, preferably connectible to a second vacuum source. A flapper valve, preferably carried along the underside of the housing floor, has sufficient surface area for substantially covering each one of the three chamber-floor apertures simultaneously. The valve is pivotable about an axis thereof in response to a predetermined vacuum-differential condition existing between vacuum sources.

9 Claims, 27 Drawing Figures

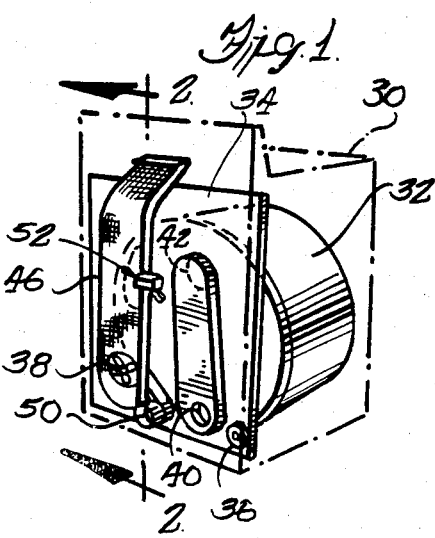
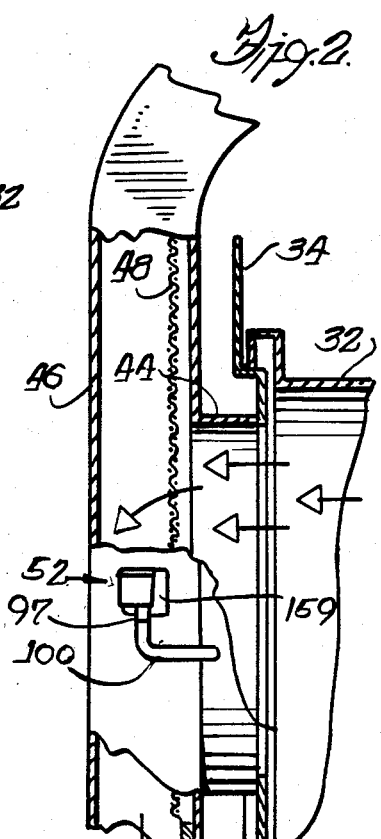
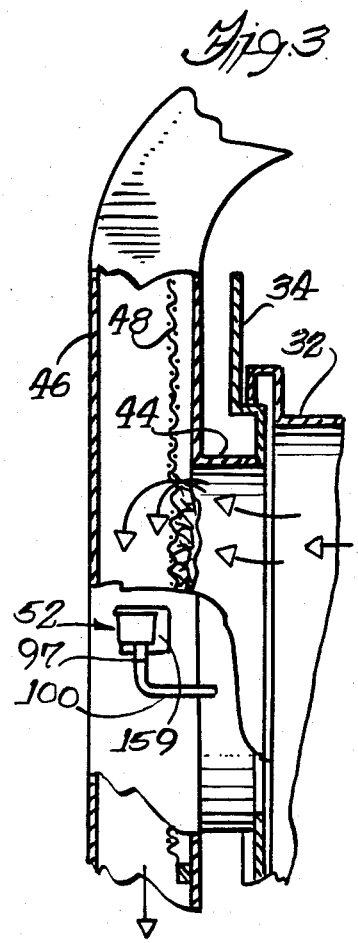
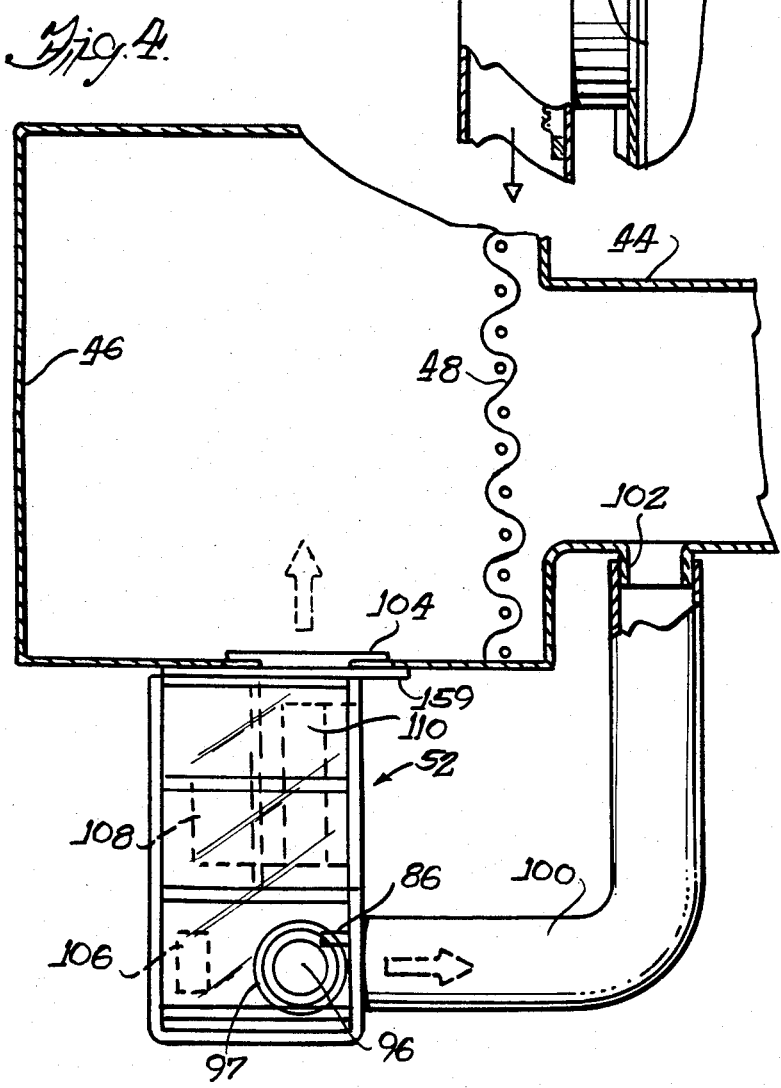

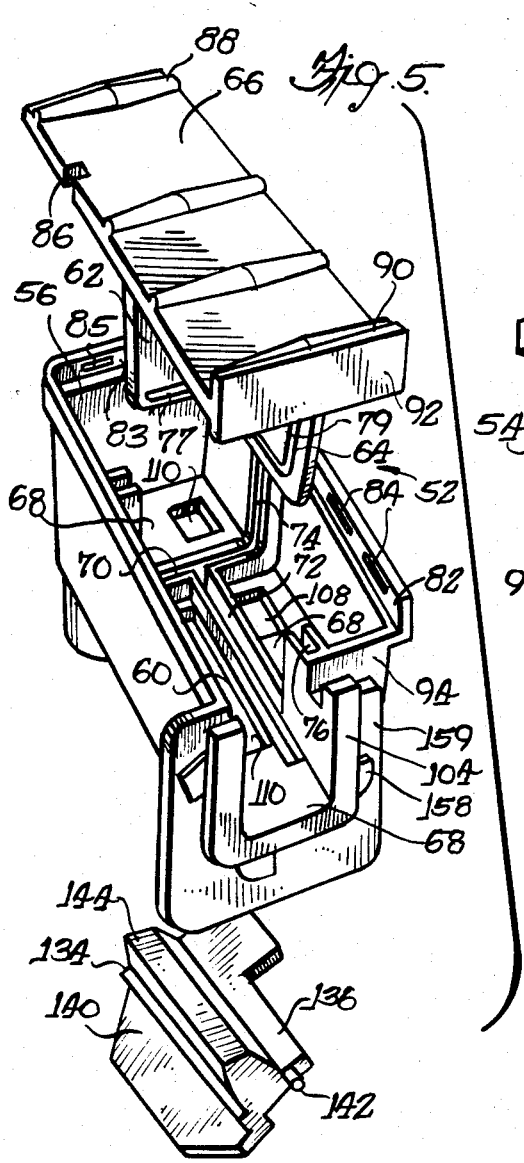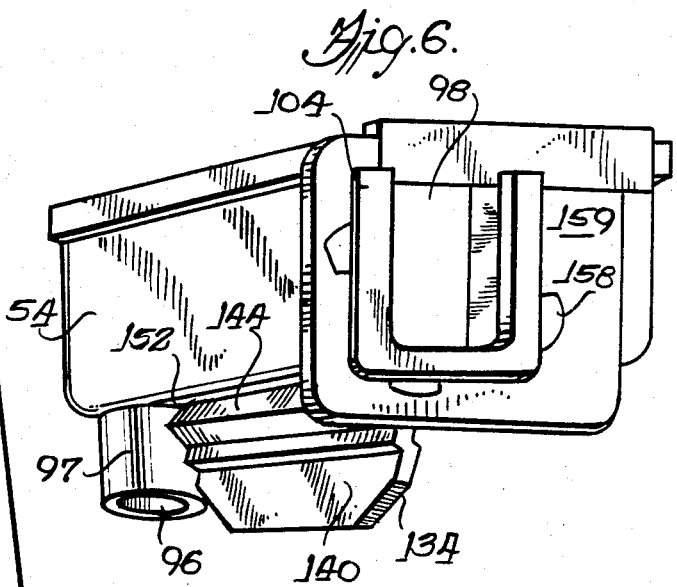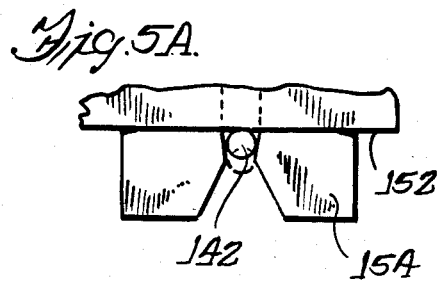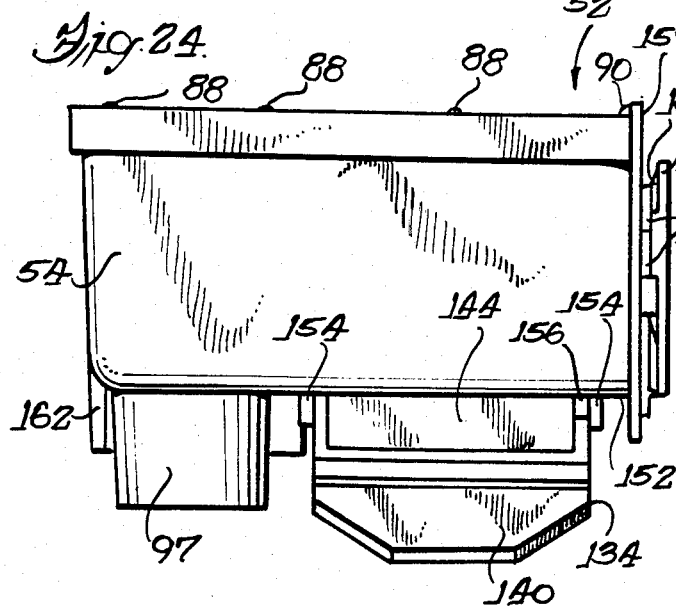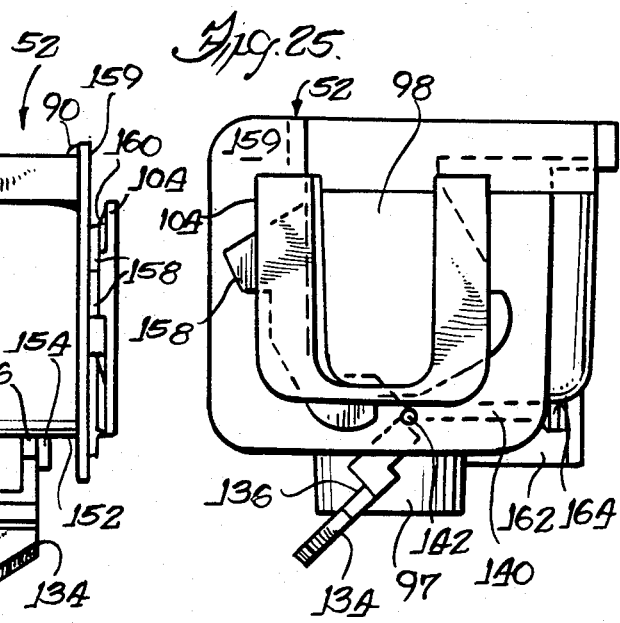

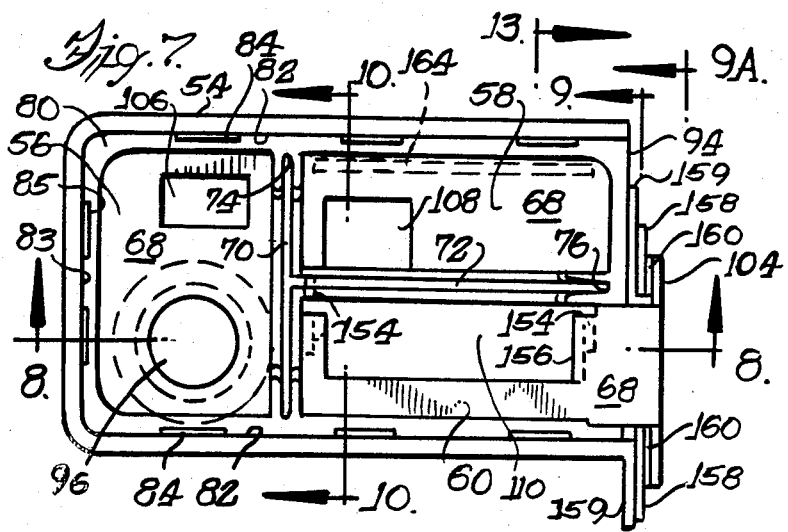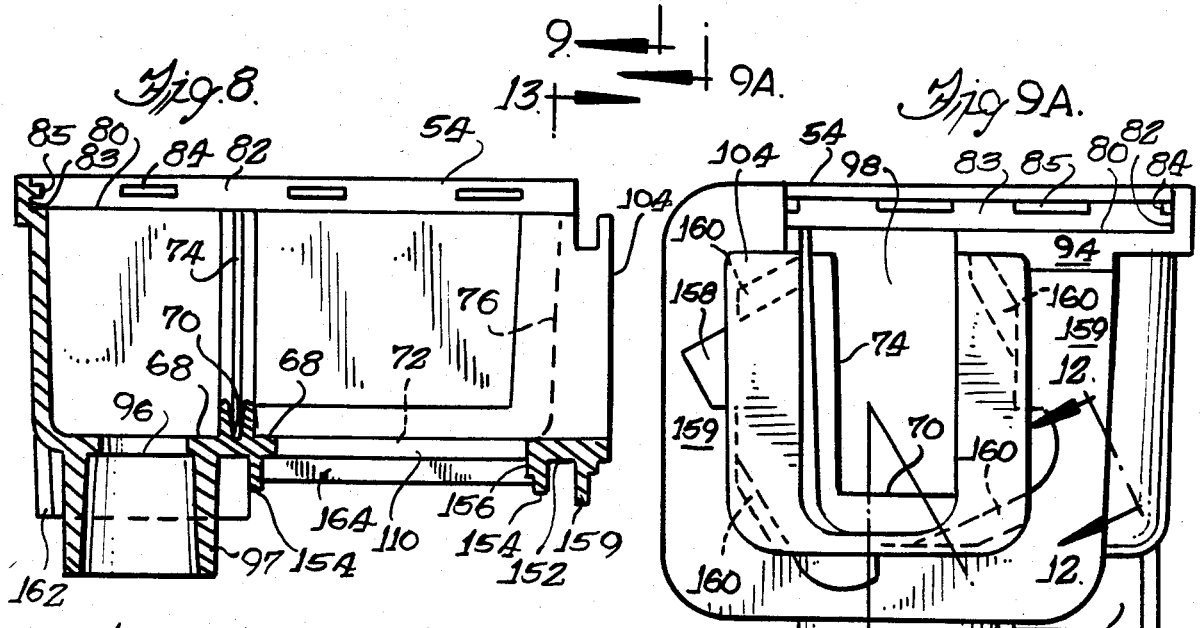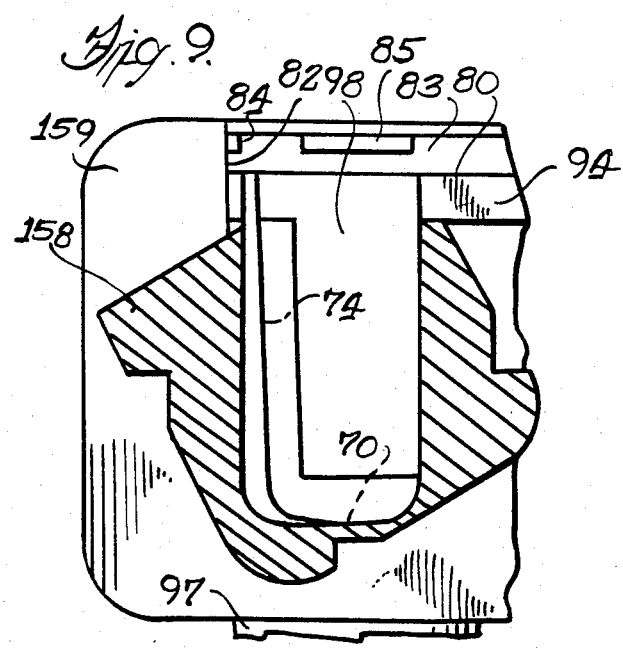

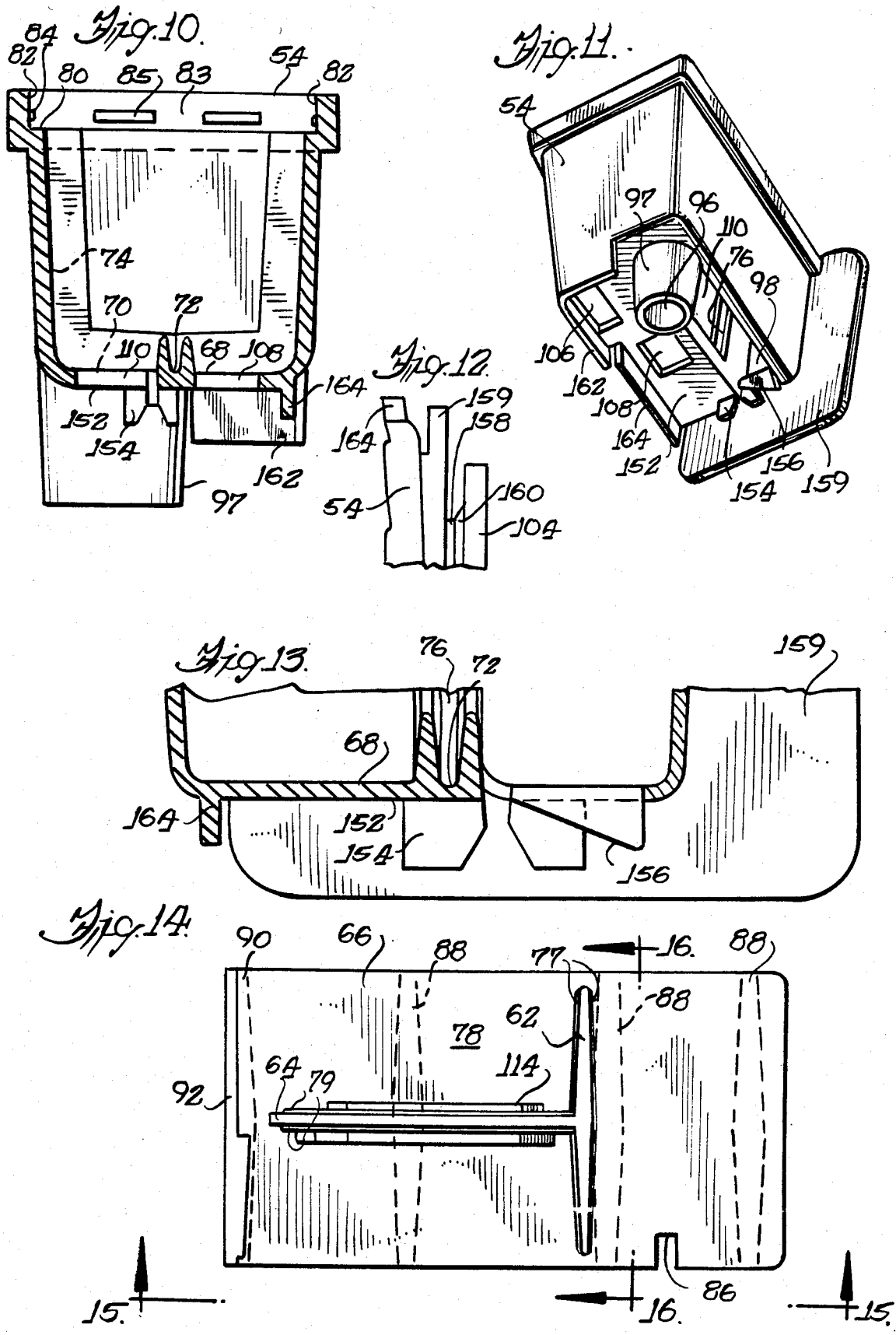

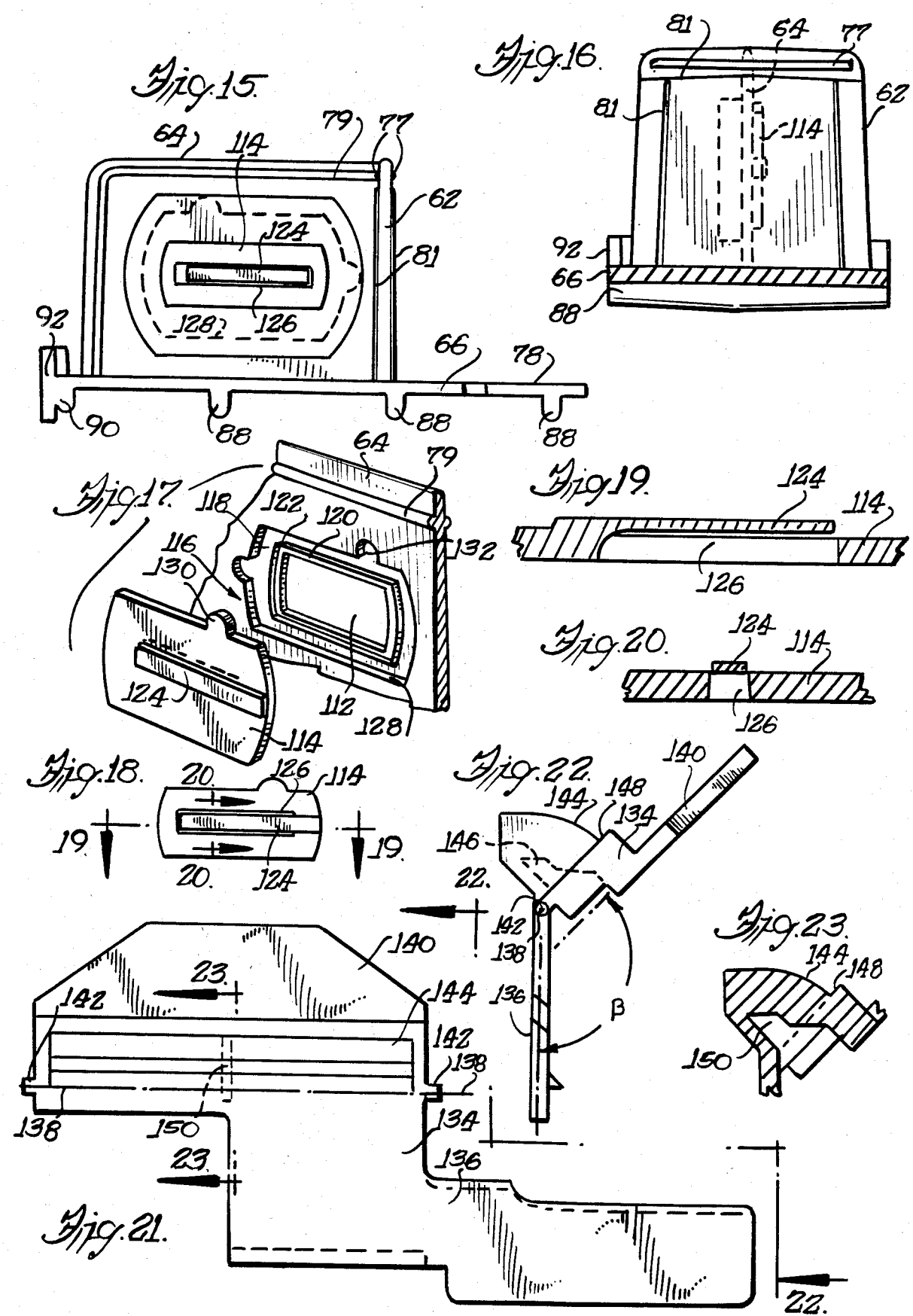

DIFFERENTIAL-VACUUM ALARM DEVICE

BACKGROUND OF THE INVENTION

This invention relates to an alarm device which operates upon the principle of differential vacuum. More particularly, the present invention relates to a device which employs an audible vibratory reed assembly, automatically activatable upon being subjected to a predetermined differential-vacuum energy level.

A variety of such devices, which incorporate vibratable reeds so as to render the device capable of producing basic sonic tones, are well known. See, for example, the U.S. Pat. No. 4,365,582 to Boyer et al, which has been assigned to the Assignee of this application.

Although it will be appreciated by those skilled in the art that the present invention is generally useful for sounding an alarm whenever a predetermined differential-vacuum condition exists between two points, the present invention will herein preferably be described as it is used in a clothes dryer.

The fact that most clothes dryers generate lint, which often affects dryer performance, is well known. During use of the '582 device as a lint alarm on a clothes dryer, for example, it has been observed that entrained lint can enter the '582 housing, become attached to a reed element thereof, and thereafter affect the tonal qualities of the reed element.

Accordingly, it is a general object of this invention to provide a novel and improved differential-vacuum signal (or alarm) device, used preferably in a lint-laden environment (such as is found in a clothes dryer).

A more specific object is to provide such a device, capable of reliable operation over a long period of time while serving as a lint buildup alarm.

A further object is to provide such a device having a reed element which is readily incorporatable into a clothes dryer and which is substantially isolated from clothes dryer lint.

OBJECTS AND SUMMARY OF THE INVENTION

The present invention, accordingly, preferably contemplates employing a housing which is divided into three substantially isolated chambers by two transverse walls. One of the two walls isolates a first one of the three chambers from the other two. The other of the two walls, preferably transverse to the first wall and integral therewith, substantially isolates the second chamber from the third. The second wall preferably carries a reed which is activated when air, preferably moving under the effects of differential vacuum, passes from one of the second and third chambers into the other.

The housing includes a housing cover, which is preferably snap engageable with the housing. The first and second walls are preferably integral with, and depend from, the housing cover. Inner surface portions of the housing preferably include integral, U-shaped, inwardly-disposed channels for receiving edge portions of the walls.

With the wall edge portions engaged in the channels and the cover snap engaged with the housing, the three chambers are substantially isolated, one from the others. The second wall preferably includes a through aperture across which a vibratable reed is disposed. A housing bottom, which forms a housing floor common to the three chambers, includes three through apertures. Each one of the floor apertures provides a respective one of the three chambers with communication outside of the housing.

One of the three chambers further includes a second through aperture, preferably connectible to a first vacuum source. One of the other two chambers similarly includes a second through aperture, preferably connectible to a second vacuum source. A flapper valve, preferably carried along the underside of the housing floor, has sufficient surface area for substantially covering each one of the three chamber-floor apertures simultaneously. The flapper valve is pivotable about an axis thereof preferably in response to a predetermined vacuum-differential condition existing as between the first and second vacuum sources.

BRIEF DESCRIPTION OF THE DRAWINGS

The foregoing, as well as other objects, features or advantages of the present invention will become more readily understood upon reading the following detailed description of the illustrated embodiment, together with reference to the drawings, wherein:

FIG. 1 is a perspective view of a home clothes dryer, partially in phantom line, into which the present invention has been incorporated;

FIG. 2 is a fragmented and partially sectional view of the clothes dryer including an end view of the invention, taken generally along the plane 2—2 of FIG. 1;

FIG. 3 is a another fragmented and partially sectional view, similar to and taken generally subsequent to the view of FIG. 2;

FIG. 4 is a fragmented top view, partially in section, similar to the view presented in FIG. 2 but on an enlarged scale relative thereto;

FIG. 5 is an exploded, perspective view of the device of the present invention;

FIG. 5A is a projected view on an enlarged scale relative to FIG. 5, illustrating cooperative engagement of two of the parts of the present invention (as disclosed in FIGS. 5, 6);

FIG. 6 is an assembled, perspective view of the device of the present invention;

FIG. 7 is a top view of a housing portion of the device;

FIG. 8 is a side view, in section, taken generally from the plane 8—8 of FIG. 7;

FIG. 9 is a partially fragmented and sectional end view, taken generally from the plane 9—9 of FIG. 7 and slightly enlarged relative to FIG. 7;

FIG. 9A is an end view of the housing, taken generally from the plane 9A—9A of FIG. 7 and slightly enlarged relative to FIG. 7;

FIG. 10 is another end view, in section, taken from the plane 10—10 of FIG. 7;

FIG. 11 is a bottom view of the housing, in perspective;

FIG. 12 is a fragmentary view, on an enlarged scale, of a detail viewable generally from the plane 12—12 of FIG. 9A;

FIG. 13 is a partially fragmented, sectional view, on an enlarged scale, taken generally along the line 13—13 of FIG. 7;

FIG. 14 is a bottom view of a housing cover for the housing of the present invention, on an enlarged scale relative to FIG. 7;

FIG. 15 is a side view of the housing cover taken generally along the plane 15—15 of FIG. 14;

FIG. 16 is an end view, partially in section, taken generally along the plane 16—16 of FIG. 14;

FIG. 17 is an exploded, partially fragmented, sectional view, in perspective, of a wall portion which is integral with the cover, the wall portion including a through aperture, and a reed plate affixable to the wall portion over the through aperture;

FIG. 18 is a top view of a preferred reed plate, on a reduced scale relative to FIG. 17;

FIG. 19 is a fragmented, sectional, side view, on an enlarged scale relative to FIG. 18, taken from the plane 19—19 of FIG. 18;

FIG. 20 is a fragmented, sectional, projected view, also on an enlarged scale relative to FIG. 18, taken from the plane 20—20 of FIG. 18;

FIG. 21 is a projected, top view of a preferred flapper valve mountable along an underside of the housing, on an enlarged scale relative to FIG. 6;

FIG. 22 is an end view of the flapper valve, taken generally along the lines 22—22 of FIG. 21;

FIG. 23 is a fragmented, sectional view, on a relatively slightly enlarged scale, presenting a detail shown in FIGS. 21 and 22;

FIG. 24 is a side view of the device of the present invention; and

FIG. 25 is an end view of the device.

DETAILED DESCRIPTION OF THE ILLUSTRATED EMBODIMENT

A clothes dryer 30 (FIG. 1) includes, in this particular model of dryer, a horizontally-disposed rotatable drum 32, preferably open at both drum ends. The back or inwardly-directed end of the drum 32 is preferably supported by an embossed bulkhead 34 (carried at the rear of the dryer 30) and at least one rubber-tired wheel 36 which is ridable in a spun-recessed track (not shown). The front or entrance end (not shown) of the drum 32 preferably has an internal, plastic liner bearing (not shown) which is supported by a front panel (also not shown) of the dryer 32.

The dryer 32 dries clothes via a vacuum system whereby a motor-driven fan 38 draws ambient air through a heating duct 40 into the drum 32 via a grille or opening 42 (FIG. 1) through the bulkhead 34. After circulating around in the drum 32, the air is then drawn through an air-exit collar 44 into a lint chute 46, with a vertically-disposed elongated, lint filter 48 presenting reistance to air passage from the collar 44 into the lint chute 46 (FIGS. 2, 3). The heated air is then drawn through the fan 38 (FIG. 1) and discharged through a duct 50 which is preferably located at the lower rear center of the dryer 30.

The preferred embodiment of the differential pressure signal (or alarm) device 52 (FIGS. 1-4, 5, 6, 24 and 25) of the present invention includes a housing 54 (FIGS. 7, 8, 9A, 10 and 11) having three separate chambers 56, 58 and 60 (FIG. 7). The signal device 52 is preferably made of a substantially transparent, high-impact, plastic material. The first chamber 56 is separated (or isolated) from the other two chambers 58, 60 by a first wall 62 (FIG. 14), and the second chamber 58 is separated (or substantially isolated) from the third chamber 60 by a second wall 64 which is integral with and disposed transverse (preferably perpendicular) to the first wall 62. A housing cover 66 (FIGS. 14-16) having the first and second walls 62, 64 integral therewith and depending from an underside thereof is mountable upon (preferably snap engageable with) the housing 54 (FIG. 5).

An inner floor 68 (FIGS. 7, 8) of the housing 54 includes a first U-shaped, tapered, integral, inwardly-disposed channel 70 and a second such channel 72 disposed transverse (preferably perpendicular) to the first channel 70 and integral therewith. The first channel 70 includes additional side channels 74 (FIG. 7) which are integral with spaced opposite end portions of the channel 70 and inner sidewalls of the housing 54. The second channel 72 similarly includes an additional side channel 76 (FIG. 7) which is integral with an inner wall portion of the housing 54 and an end of the second channel 72 which is in distal relation to the first channel 70.

Edge portions of the first and second walls 62, 64 respectively include continuous, integral, raised edge projections 77, 79 (FIGS. 14, 15) which snugly fit into the channels 70, 72, 74 and 76 when a lower surface 78 of the housing cover 66 (FIG. 15) abuts an upper lip or surface 80 of the housing 54 (FIGS. 7, 8). End portions of the walls 62, 64, when thus engaged with the channels 70, 72, 74 and 76 (FIG. 5), thereby provide the housing 54 with the three chambers 56, 58 and 60, mentioned above. The first wall 62 further preferably includes a second set of integral projections 81 (FIGS. 15, 16) for substantially isolating the first chamber 56 from the other two chambers 58, 60 when edge portions of the walls 62, 64 engage the channels 70, 72, 74 and 76 as described above.

A pair of spaced, opposite, inner, lateral walls 82 which are integral with and extend upwardly from the lip 80 include a plurality of (preferably six) longitudinally-spaced projections 84 (FIG. 7). Three of such projections 84 are preferably approximately equally spaced, one such projection 84 from an adjacent projection 84, along one wall 82 (FIG. 8). The projections 84 of opposite walls 82, moreover, are approximately facing each other (FIG. 7). Transverse (preferably perpendicular) to and intermediate the spaced lateral walls 82 is an integral back wall 83 which similarly includes projections 85 (FIG. 7) for snap engaging the cover 66 with the housing 54.

To snap engage the cover 66 with the housing 54, edge portions of the cover 66 are snapped past the projections 84 and 85 while the first and second walls 62, 64 are respectively engaging the sidewall channels 74, 76. A dimension, measured from the underside of the projections 84, 85 and the upper surface of the lip 80, is preferably such that the projections 84, 85 cause the lower surface 78 of the cover 66 to come into abutment with the upper lip 80 of the housing 54.

A portion of the housing cover 66 above the first chamber 56 (FIG. 5) further preferably includes a relatively small rectangular through aperture 86 (FIG. 14) into which a tool (not shown) can be inserted for removing the cover 66 from the housing 54.

So as to add strength to the housing cover 66, the cover 66 preferably includes four integral, spaced, transversely disposed ribs 88, 90 (FIGS. 14, 15), the fourth rib 90 being integral with a transverse sidewall portion 92 (FIG. 15) which itself is integral with the cover 66. With the housing cover 66 snap engaged with the housing 54, as above described, the surface of the sidewall portion 92 (of the cover 66) and an exterior surface of an inner wall 94 (FIG. 9A) of the housing 54 preferably come into substantial contact and abut (FIG. 25) for sealing the housing 54, thereby isolating the chambers 56, 58 and 60 one from the other, as described above.

Each of the first and third chambers 56, 60 preferably includes a respective through aperture 96 (FIG. 7) and 98 (FIG. 9A) for connecting the device 52 to a predetermined vacuum differential. Surrounding the through aperture 96 and integral with an external portion of the housing 54 is a tubular member (or tube) 97 (FIGS. 8, 11). To bring the first chamber 56 into communication with the air exit collar 44, a piece of conduit 100 preferably is connected (at a first end thereof) to the tube 97 and at a second end (opposite the first end) to a pipe nipple 102 which is affixed to and surrounds a hole through the exit collar 44 (FIG. 4). Such a connection subjects the first chamber 56 to a vacuum condition which exists on the upstream side of the filter 48 (FIG. 4).

The chute 46 preferably further includes a through aperture which is relatively greater in dimension than a flange 104 (FIGS. 4–6) which is integral with the housing 54. The flange 104 is preferably U-shaped and substantially surrounds the aperture 98 (FIG. 9A). The chute aperture, moreover, is preferably displaced by an angle alpha ($\alpha$) relative to the flange 104 (FIG. 9A) for vertically affixing the housing 54 to the chute 46. Affixing the housing 54 to the chute 46 in this manner, moreover, puts the third chamber 60 into communication with a second vacuum condition which is inside the chute 46 and downstream of the filter 48 (FIG. 4).

The floor 68 of the housing 54 further preferably includes three through apertures 106, 108 and 110 (FIG. 7), each such aperture 106, 108 and 110 being for providing one of the respective three chambers 56, 58 and 60 with ambient air. As used herein, "ambient air" means air of about 14.7 pounds per square inch absolute (psia).

The second wall 64 of the cover 66 preferably includes a through aperture 112 (FIG. 17) across which a reed plate 114 (FIG. 18) is affixable (FIG. 15), such as by gluing portions of the reed plate 114 and second wall 64 together. Surrounding the aperture 112, the wall 64 includes a depression 116 which is divided into first and second sections 118, 120 (FIG. 17) by an integral divider 122. The divider 122 extends from the wall 64 and also surrounds the aperture 112. The shape of the reed plate 114, relative to the shape of the depression 116, is such that the reed plate 114 fits within the perimeter 128 of the depression 116 and preferably continuously abuts against the divider 122.

The reed plate 114 includes an integral reed element 124 (FIGS. 19, 20) which is disposed longitudinally above an elongated aperture 126 through the reed plate 114. The transverse dimensions of the reed element 124 are slightly less than are the transverse dimensions of the through aperture 126 (FIG. 18). As can be appreciated by those skilled in the art of reeds, when air of sufficient energy is drawn across the reed element 124 and subsequently through the aperture 126, the reed is caused to vibrate thereby creating a distinct audible tone.

It is, at present, desirable to affix the reed plate 114 to the second wall 64 in a manner such that air (of sufficient energy) passing from the second chamber 58 into the third chamber 60 causes the reed element 124 to sound a predetermined tone. The reed plate 114 accordingly includes an integral, asymmetric finger 130 (FIG. 17) disposed transverse to the reed element 124; and the first section 118 of the depression 116 correspondingly includes an indentation 132 (FIG. 17) into which the finger 130 must first be disposed before the reed plate 114 comes into continuous contact with the divider 122 (as above described).

A flapper valve 134 (FIG. 21), carried along an underside of the housing 54, will now be described. The flapper valve 134 includes a first integral wing 136 disposed about an axis 138 and a second wing 140 similarly disposed about the axis 138 but at an angle beta ($\beta$) (FIG. 22) relative to the first wing 136. The flapper valve 134 further preferably includes integral pintles 142 at spaced opposite end portions of the axis 138 (FIG. 21), and an integral, elongated, arcuate projection 144 (FIG. 22) radially disposed about the axis 138 intermediate and in distal relation to the first and second wings 136, 140. A core portion of the projection 144 preferably includes a hollow recess 146 (FIG. 22) for affecting rotational balance of the flapper valve 134, and an abutment 148 (FIGS. 22, 23) integral with the second wing 140. Bridging the recess 146 and disposed transverse to the axis 138 is an integral, structural rib 150 (FIGS. 21, 23) which provides the projection 144 with lateral strength.

An underside 152 of the housing 54 (FIG. 8) further preferably includes a pair of integral, Y-shaped pivots 154 which are spaced at opposite end portions of the third aperture 110 (FIGS. 7, 8) for receiving the pintles 142. The shape of the projection 144, relative to the third aperture 110, is such that there is a relatively small degree of clearance around the projection 144 when the projection 144 is disposed into the third aperture 110 and the pintles 142 are snapped into the pivots 154. The shape of the first wing 136 (FIG. 21), moreover, is such that with the pintles 142 snapped into the pivots 154 and the first wing 136 engaging the underside 152 of the housing 54, the first wing 136 additionally covers the first and second apertures 106, 108 thereby substantially preventing air from flowing through the first and second apertures 106, 108.

About the axis 138, the second wing 140 and projection 144 together preferably have relatively greater mass than the first wing 136. The through apertures 106, 108 and 110, moreover, are positioned through the housing floor 68 so as to permit the valve 134 to function by pivoting about the axis 138 in a manner which is described below in greater detail.

The pivots 154 communicate through the housing floor 68 with the third chamber 60 (FIG. 7). The pivots 154, moreover, are so shaped relative to the diameter of the pintles 142 (FIG. 5A) such that the flapper valve 134 (with the projection 144 disposed in the aperture 110 as above described) is readily snap engageable with and snap disengageable from the housing 54 when using a tool such as, for example, a small-diameter push rod (not shown).

The housing 54 further preferably includes an integral stop 156 (FIG. 13) for preventing the flapper valve abutment 148 (FIG. 22) from coming into contact with the housing underside 152 (FIG. 8).

Optional integral structural advantages or features of the present invention for snugly affixing the housing 54 to the chute 46 (FIG. 4) will now be briefly discussed. The flange 104 longitudinally extends outwardly from the housing wall 94 (FIG. 9A). An integral abutment 158, which also extends longitudinally outwardly from the housing wall 94, extends relatively less than does the flange 104 (FIG. 7). An integral backing or bracing flange 159 is intermediate the abutment 158 and housing wall 94. The abutment 158 (FIG. 9) is disposed, by the angle alpha (α) (FIG. 9A), from the flange 104. Extending from a backside of the flange 104 is a plurality of (preferably four) circumferentially-spaced integral wedges 160 (FIG. 12) which, in turn, are also integral with the abutment 158 and the flange 104 (FIG. 7). Dimensions between the flange 104 and the abutment 158 are preferably so related relative to the thickness of the chute 46 (FIG. 4), that when the flange 104 is disposed within the chute hole and rotated about the angle alpha (α) as above described, the surfaces of the wedges 160 (FIG. 9A) serve to wedge the chute 46 between the flange 104 and the abutment 158 (FIG. 7). Securement of the housing 54 to the chute 46 as above described, moreover, has been found to provide a virtually leak-proof seal at the junction thereof. The operation of the present invention, in its preferred use, will now be addressed. Prior to being put into such use, and with the cover 66 (having been snapped into engagement with the housing 54) facing upwardly, the mass of the second wing 140 together with the mass of the projection 144 (of the flapper valve 134) is sufficiently greater than the mass of the first wing 136 such that the first wing 136 abuts the underside 152 of the housing 54 thereby substantially sealing the apertures 106, 108 of the respective first and second chambers 56, 58. The wing 136 also preferably abuts the housing underside 152 while the third chamber 60 communicates (via the aperture 98) with a first vacuum source or condition (in the chute 46 downstream of the filter 48) and while the first chamber 56 communicates (via the aperture 96 and the conduit 100) to a second vacuum source or condition. The second vacuum condition, approximately equal in magnitude to the first vacuum condition, is within the collar 44 upstream of the filter 48 (FIG. 4). The wing 136, moreover, continues to abut the housing underside 152 as the dryer 30 functions in a normal manner.

It can be appreciated, as the dryer 30 is used over a period of time (FIG. 2), that lint usually will begin to build up on the upstream side of the filter 48 (FIG. 3) with a result being that an imbalance in vacuum is experienced in the housing 54 as between the first and third chambers 56, 60. From the above discussion, it can be appreciated that ambient air, which enters the third chamber 60 intermediate the projection 144 and housing underside 152 so as to counteract the imbalance, acts along an underside of the projection 144 and imparts a negative moment (i.e., counterclockwise rotation about the axis 138 as viewed from FIG. 22) upon the flapper valve 134. It can further be appreciated, moreover, that vacuum conditions in the first and second chambers 56, 58 cause ambient air acting respectively at the first and second through apertures 106, 108 to impart a positive moment upon the flapper valve 134.

At some point in time, because of lint buildup on the filter 48, a predetermined vacuum differential as between the first and third chambers 56, 60 (whereby the third chamber 60 is subjected to a vacuum condition of relatively greater absolute magnitude than the vacuum condition of the first chamber 56), will cause the flapper valve 134 to lose the effect of the positive moment projected on the wing 136 through the aperture 106. Once the frictional resistance between the pintles 142 and pivots 154 is overcome, the flapper valve 134 will be caused to rotate counterclockwise about the axis 138 (FIG. 22), which, in turn, causes the first wing 136 to be removed from the second chamber through aperture 108. When the vacuum within the third chamber 60 is sufficiently less (on an absolute scale) than ambient pressure, ambient air accordingly will be caused to enter the second chamber 58 via the second chamber through aperture 108, once the first wing 136 has been removed from the through aperture 108, because the second and third chambers 58, 60 are in communication via the reed aperture 126. When such ambient air, being drawn through the aperture 108 into the second chamber 58, has sufficient energy velocity for vibrating the reed element 124, as above described, a tone is sounded thereby warning a dryer user of lint or other buildup at the lint screen 48 (FIG. 4).

Because of the presence of the filter 48 in the chute 46, it can be appreciated that the air downstream of the filter 48 is relatively (and probably substantially) less lint-laden than is the air upstream of the filter 48 (FIG. 4). Even though the first and third chambers 56, 60 of the device 52 are being subjected to vacuum conditions, which presupposes that air flow from the first and third chambers 56, 60 is (in the directional sense) out of the apertures 96, 98, respectively, yet it has been observed that lint, probably being transported via entrainment mechanisms, can accumulate in the first chamber 56. However, since the first wall 62 and channels 70, 74 cooperate to seal the first chamber 56 from the reed plate 114, as above described, no such entrained lint affects the tonal qualities of the reed element 124 of the present invention. Moreover, entrainment of lint via the third chamber 60 onto the reed plate 114 has not been observed.

During normal operation, it is therefore expected that ambient air will be drawn through the apertures 106, 108 of the respective first and second chambers 56, 58 into the housing 54. The housing underside 152 accordingly incorporates integral baffles 162, 164 (FIGS. 8, 11) respectively proximate to the first and second apertures 106, 108 for preventing at least a portion of dust and other impurity materials normally present in the ambient air from being drawn into the first and second chambers 56, 58.

From the above description it can be appreciated that the instant invention can assume a variety of shapes. For example, the shape of the housing 54 need not necessarily be in the form of a generally rectangular solid, nor need the first and second walls 62, 64 be transverse to each other. A housing of non-rectangular shape having two spaced, non-transversely disposed walls for creating three separate chambers within such a housing would be just as effective. With two of the chambers in separate communication with the first and second vacuum sources or conditions, respectively, and with a third chamber being in communication with one of these two chambers via a reed plate (taking care to avoid selecting the chamber having the relatively higher probability of lint buildup as the communicating chamber), it can be appreciated that apertures through the floor of such a housing could be so disposed, one to the other, such that another flapper valve, embracing certain essential features of the above-described flapper valve 134, can be made to cooperate with such a housing so that such a housing, in cooperation with such other flapper valve, can function essentially as has been described above (for the device 52).

What has been illustrated and described herein is a novel differential-vacuum signal device. While the signal device of the instant invention has been illustrated and described with reference to a preferred embodiment, the invention is not limited thereto. On the contrary, alternatives, changes or modifications may become apparent to those skilled in the art upon reading the foregoing description. Accordingly, such alternatives, changes and modifications are to be considered as forming a part of the invention insofar as they fall within the spirit and scope of the appended claims.

Although the instant invention, moreover, has been described with reference to a particular use in a clothes dryer, it can further be appreciated that the scope of the use of the instant invention is not to be limited thereto. For example, although the instant invention has been described with reference to sounding an alarm in response to a predetermined imbalance between two vacuum conditions, it can be appreciated that another embodiment (not shown) of the invention can be used for sounding an audible signal in response to an imbalanced pressure condition as between two pressurized sources of a fluid such as ambient air and the like.

We claim:

1. A device for sounding a tone responsive to a predetermined vacuum differential between a first vacuum source and a second vacuum source, comprising: a housing having a floor and including a snap engageable cover and first and second wall means carried by said housing for forming within said housing three separate internal chambers, said cover being engageable and disengageable from said housing, each one of said three chambers having a chamber floor common with a portion of said housing floor; first and second communication means for respectively bringing a first one and a second one of said three chambers into communication with said first and second vacuum sources; first, second and third aperture means respectively through said first, second and third chamber floors for bringing each respective one of said three chambers into communication with ambient pressure outside of said housing; reed means carried by one of said first and second wall means, said reed means having a through aperture for bringing two of said three chambers which are located on opposite sides of said one of said first and second wall means into communication, said reed means further having a reed element integral with said reed means and overlying said reed means aperture, for sounding said tone in response to air of predetermined velocity energy flowing in a predetermined direction through said reed means aperture; and valve means carried by said housing, engageable with at least one of said first, second and third aperture means, actuable in response to said predetermined vacuum differential, for causing air to flow in said predetermined direction through said reed means aperture for sounding said tone.

2. A device for sounding a tone responsive to a predetermined vacuum differential between a first vacuum source and a second vacuum source, said predetermined vacuum differential including said first and second vacuum sources which are respectively at relatively lesser absolute pressures than said ambient pressures, where said ambient pressure is about 14.7 psia, comprising: a housing having a floor and including a cover, said cover being snap engageable with and snap disengageable from said housing, first and second wall means carried by said housing for forming within said housing three separate internal chambers, each one of said three chambers having a chamber floor common with a portion of said housing floor; first and second communication means for respectively bringing a first one and a second one of said three chambers into communication with said first and second vacuum sources; first, second and third aperture means respectively through said first, second and third chamber floors for bringing each respective one of said three chambers into communication with ambient pressure outside of said housing; reed means carried by one of said first and second wall means, said reed means having a through aperture for bringing two of said three chambers which are located on opposite sides of said one of said first and second wall means into communication, said reed means further having a reed element integral with said reed means and overlaying said reed means aperture, for sounding said tone in response to air of predetermined velocity energy flowing in a predetermined direction through said reed means aperture; and valve means carried by said housing, engageable with at least one of said first, second and third aperture means, actuable in response to said predetermined vacuum differential, for causing air to flow in said predetermined direction through said reed means aperture for sounding said tone.

3. The device of claim 2 wherein said first and second wall means respectively include a first and a second wall integral with said cover, one of said first and second walls being integral with and transverse to the other of said first and second walls, one of said first and second walls having reed means affixed thereto.

4. The device of claim 3 wherein said reed means is glued to said one of said first and second walls.

5. The device of claim 4 wherein said first and second walls are perpendicular.

6. The device of claim 5 wherein said valve means is snap engageable with and snap disengageable from said housing.

7. The device of claim 6 being made of substantially transparent, high-impact plastic material.

8. A device for sounding an audible signal in response to a predetermined vacuum differential between a first vacuum source and a second vacuum source, comprising a housing having first, second and third separate enclosed chambers; means for connecting said first chamber with said first vacuum source and for separately connecting said second chamber to said second vacuum source; first, second and third apertures formed through said housing into direct communication, respectively, between said first, second and third chambers and the ambient air outside of said housing; an apertured plate-like member interconnecting said second and third chambers, a resilient elongated flat reed attached at one end to said plate-like member and disposed to overlie the aperture therein; a controlled flapper valve means normally closing said first and second apertures responsive to said predetermined vacuum differential to cause said first and second apertures to open, whereby the opening of said second aperture causes air of a predetermined velocity to flow from said second chamber through said aperture in said plate-like member and vibrate said reed to produce an audible signal.

9. A device for sounding a tone responsive to a predetermined vacuum differential between a first vacuum source and a second vacuum source, comprising: an enclosed housing having a floor, and first and second walls dividing said housing into three separate enclosed chambers, each one of said three chambers having a chamber floor common with a portion of said housing floor; first and second communication means for respectively bringing a first one and a second one of said three chambers into communication, respectively, with said first and second vacuum source; first, second and third aperture means respectively through said first, second and third chamber floors for bringing each respective one of said three chambers into communication with ambient pressure outside of said housing; reed means carried by said second wall means, said reed means having a through aperture for bringing said second and third chambers into communication, said reed means further having a reed element integral with said reed means and overlaying said reed means aperture for sounding said tone in response to air of predetermined velocity energy flowing from said second aperture through said reed means aperture; and valve means pivotally mounted to the outside surface of said housing and movable between a first and second position, said valve means having two wing members angularly spaced apart relative to the pivotal axis of said valve means where one wing member normally closes said first and second apertures and the other wing member is normally spaced from said third aperture and where said valve means pivots to cause said one wing member to open said first and second apertures upon the occurrence of said predetermined vacuum differential to thereby actuate said reed means to produce said audible tone.

* * * * *